(12) United States Patent
Kwon (10) Patent No.: US 10,082,706 B2
(45) Date of Patent: Sep. 25, 2018

(54) LIQUID CRYSTAL DISPLAY DEVICE

(71) Applicant: Samsung Display Co. Ltd., Yongin-si (KR)

(72) Inventor: Ji Hyun Kwon, Asan-si (KR)

(73) Assignee: SAMSUNG DISPLAY CO. LTD., Gyeonggi-do (KR)

( * ) Notice: Subject to any disclaimer, the term of this patent is extended or adjusted under 35 U.S.C. 154(b) by 0 days.

(21) Appl. No.: 15/398,696

(22) Filed: Jan. 4, 2017

(65) Prior Publication Data

US 2017/0192281 A1    Jul. 6, 2017

(30) Foreign Application Priority Data

Jan. 6, 2016 (KR) .................. 10-2016-0001694

(51) Int. Cl.
*G02F 1/1339* (2006.01)
*G02F 1/1343* (2006.01)
*G02F 1/1362* (2006.01)

(52) U.S. Cl.
CPC .... *G02F 1/13394* (2013.01); *G02F 1/134309* (2013.01); *G02F 1/136209* (2013.01); *G02F 1/136286* (2013.01); *G02F 2201/123* (2013.01)

(58) Field of Classification Search
CPC .......... G02F 1/13394; G02F 1/134309; G02F 1/136209; G02F 1/136286; G02F 2201/123
See application file for complete search history.

(56) References Cited

U.S. PATENT DOCUMENTS

| 7,738,068 | B2 | 6/2010 | Lee | |
|---|---|---|---|---|
| 2009/0185094 | A1* | 7/2009 | Lee | G02F 1/13394 349/46 |
| 2013/0342782 | A1* | 12/2013 | Kim | G02F 1/13394 349/46 |
| 2015/0085215 | A1* | 3/2015 | Yoshida | G02F 1/136213 349/39 |

* cited by examiner

*Primary Examiner* — Nathanael R Briggs
(74) *Attorney, Agent, or Firm* — Cantor Colburn LLP (57) ABSTRACT

A liquid crystal display device includes first and second substrates, a liquid crystal layer, a first signal line including a 1-1st signal line and a 1-2nd signal line extending in a first direction, a second signal line extending in a second direction, a pixel electrode in a pixel region of the first substrate, a first seat part on the first substrate and in a first region between the 1-1st signal line and the 1-2nd signal line and at least partially overlapping the second signal line, a second seat part on the first seat part and overlapping at least a part of the first seat part, and a column spacer disposed on the second substrate and including a seating surface at least partially overlapping the second seat part, where the pixel electrode is disposed outside a region between the 1-1st signal line and the 1-2nd signal line.

21 Claims, 9 Drawing Sheets

LIQUID CRYSTAL DISPLAY DEVICE

This application claims priority to Korean Patent Application No. 10-2016-0001694, filed on Jan. 6, 2016, and all the benefits accruing therefrom under 35 U.S.C. § 119, the content of which in its entirety is herein incorporated by reference.

BACKGROUND

1. Field

Exemplary embodiments of the invention relate to a liquid crystal display device.

2. Description of the Related Art

An importance of display devices is increasing along with a development of multimedia. Accordingly, various kinds of display devices such as a liquid crystal display ("LCD"), an organic light emitting diode ("OLED") and the like are being used.

The LCD is presently one of most widely used flat panel display devices, and generally includes two substrates (an upper substrate and a lower substrate) having electric field generating electrodes such as pixel electrodes and a common electrode disposed thereon, and a liquid crystal layer interposed between the substrates. In the LCD, a voltage is applied to the electric field generating electrodes so as to generate an electric field in the liquid crystal layer, which thus determines an orientation of liquid crystal molecules of the liquid crystal layer and controls a polarization of incident light, thereby displaying desired images.

A thickness of the liquid crystal layer interposed between the upper substrate and the lower substrate is referred to as a cell gap, and the cell gap may influence overall operating characteristics of the LCD device such as response speed, contrast ratio, viewing angle and luminance uniformity. A non-uniformity of the cell gap may prevent an image from being uniformly displayed all over the whole surface of a screen, thus causing image quality defects. Therefore, an arrangement of a column spacer to maintain a uniform cell gap throughout the whole surface of the upper and lower substrates is desired.

SUMMARY

In general, a liquid crystal display ("LCD") device is manufactured by disposing a liquid crystal layer on a lower substrate and bonding the lower substrate and an upper substrate to each other. When misalignment occurs during the process of bonding the upper substrate and lower substrate to each other, a surface of the upper or lower substrate on which a column spacer is seated becomes non-uniform and thus a cell gap difference may occur between the upper substrate and the lower substrate. To prevent the cell gap difference, an area of the surface on which the column spacer is seated can be widened, which, however, may cause reduction of an aperture area of a pixel and thus reduced aperture ratio.

An exemplary embodiment of the invention provides an LCD device in which a stable seating surface for a column spacer is ensured with minimized reduction of aperture ratio.

According to an exemplary embodiment of the invention, there is provided an LCD device including: a first substrate and a second substrate facing each other, a liquid crystal layer interposed between the first substrate and the second substrate, a first signal line disposed on the first substrate and including a 1-1st signal line and a 1-2nd signal line extending in a first direction, a second signal line disposed on the first signal line, and extending in a second direction perpendicular to the first direction, and intersecting the 1-1st signal line and the 1-2nd signal line, a pixel electrode disposed in a pixel region of the first substrate, a first seat part disposed on the first substrate, and disposed in a first region between the 1-1st signal line and the 1-2nd signal line, and at least partially overlapping the second signal line, a second seat part disposed on the first seat part and overlapping at least a part of the first seat part, and a column spacer disposed on the second substrate and including a seating surface at least partially overlapping the second seat part, where the pixel electrode is disposed outside a region between the 1-1st signal line and the 1-2nd signal line.

In an exemplary embodiment, the first seat part may be disposed in the same layer as the first signal line, and the second seat part may be disposed in the same layer as the second signal line.

In an exemplary embodiment, the first seat part may be spaced apart from the 1-1st signal line and the 1-2nd signal line, and the second seat part may be unitary with the second signal line.

In an exemplary embodiment, the second seat part may include a 2-1st seat part branched from the second signal line toward one side in the first direction, and a 2-2nd seat part branched from the second signal line toward another side opposite to the one side.

In an exemplary embodiment, the first region may include an extended region disposed in at least either one side in the second direction or another side opposite to the one side, and the second signal line may traverse the extended region.

In an exemplary embodiment, the first seat part may overlap at least a part of the extended region.

In an exemplary embodiment, the second seat part and the seating surface may be disposed inside the first seat part.

In an exemplary embodiment, the seating surface may have a circular shape in a plan view.

In an exemplary embodiment, the second signal line may traverse the seating surface.

In an exemplary embodiment, a part of the seating surface may be disposed outside the second seat part and the second signal line.

In an exemplary embodiment, the first signal line may be a gate line and the second signal line may be a data line.

In an exemplary embodiment, the LCD device may further include a source electrode branched from the second seat part toward one side in the first direction and toward another side opposite to the one side.

In an exemplary embodiment, the LCD device may further include a sustain electrode disposed in the same layer as the first signal line, and a pixel electrode disposed on the second signal line, where at least a part of the sustain electrode may overlap the pixel electrode, and the sustain electrode may be disposed in one side of the 1-1st signal line in the second direction and another side of the 1-2nd signal line.

In an exemplary embodiment, the LCD device may further include a light blocking pattern disposed on the second substrate, where the light blocking pattern may overlap a region between the 1-1st signal line and the 1-2nd signal line.

In an exemplary embodiment, the first signal line may be disposed in one side of the pixel region in the second direction and another side opposite to the one side, and the second signal line may be disposed only in either one side of the pixel region in the first direction or another side opposite to the one side, and the pixel region may not be surrounded by the first signal line and the second signal line.

In an exemplary embodiment, the LCD device may further include a connection part disposed in the same layer as the first seat part, where one end of the connection part in the second direction is connected to either the 1-1st signal line or the 1-2nd signal line, and another end of the connection part in the second direction is connected to the first seat part.

In an exemplary embodiment, the first seat part may include a 1-1st seat part branched toward another side of the 1-1st signal line in the second direction, and a 1-2nd seat part branched toward one side of the 1-2nd signal line in the second direction, where the 1-1st seat part and the 1-2nd seat part may be spaced apart from each other.

In an exemplary embodiment, a width of the first region in the second direction may be constant.

In an exemplary embodiment, the second seat part may include a 2-1st seat part branched from the second signal line toward one side in the second direction, and a 2-2nd seat part branched from the second signal line toward another side opposite to the one side, where the 2-1st seat part and the 2-2nd seat part may respectively overlap the 1-1st signal line and the 1-2nd signal line.

In an exemplary embodiment, the 1-1st seat part may include a first protrusion and a first recess may be defined in the 1-1st seat part at another end thereof in the second direction, and the 1-2nd seat part may include a second protrusion and a second recess may be defined in the 1-2nd seat part at one end thereof in the second direction, where the first protrusion and the second recess face each other, and the second protrusion and the first recess face each other.

In an exemplary embodiment, the LCD device according to an exemplary embodiment of the invention may prevent defects relating to a cell gap.

In an exemplary embodiment, the LCD device according to an exemplary embodiment of the invention may ensure a stable seating surface for a column spacer while minimizing reduction of aperture ratio.

However, effects of the invention are not restricted to the exemplary embodiments set forth herein and more diverse effects are included in this description.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

The aspects and features of the present invention and methods for achieving the aspects and features will be apparent by referring to the embodiments to be described in detail with reference to the accompanying drawings. However, the invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described with reference to the attached drawings.

Figure 1:
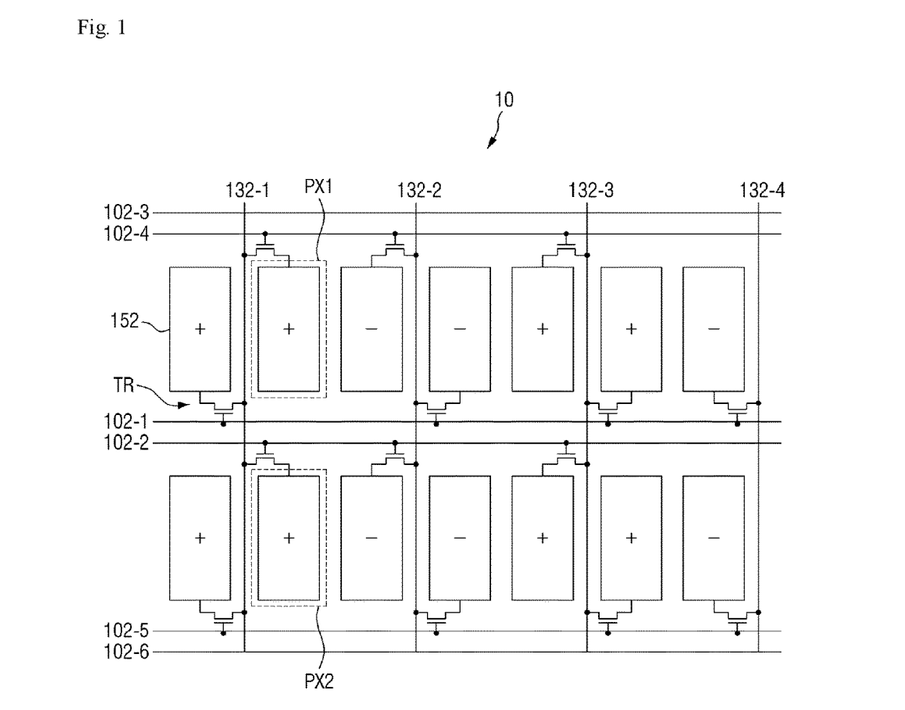
FIG. 1 is a plan view illustrating an exemplary embodiment of a pixel structure of a liquid crystal display ("LCD") device according to the invention.
Figure 2:
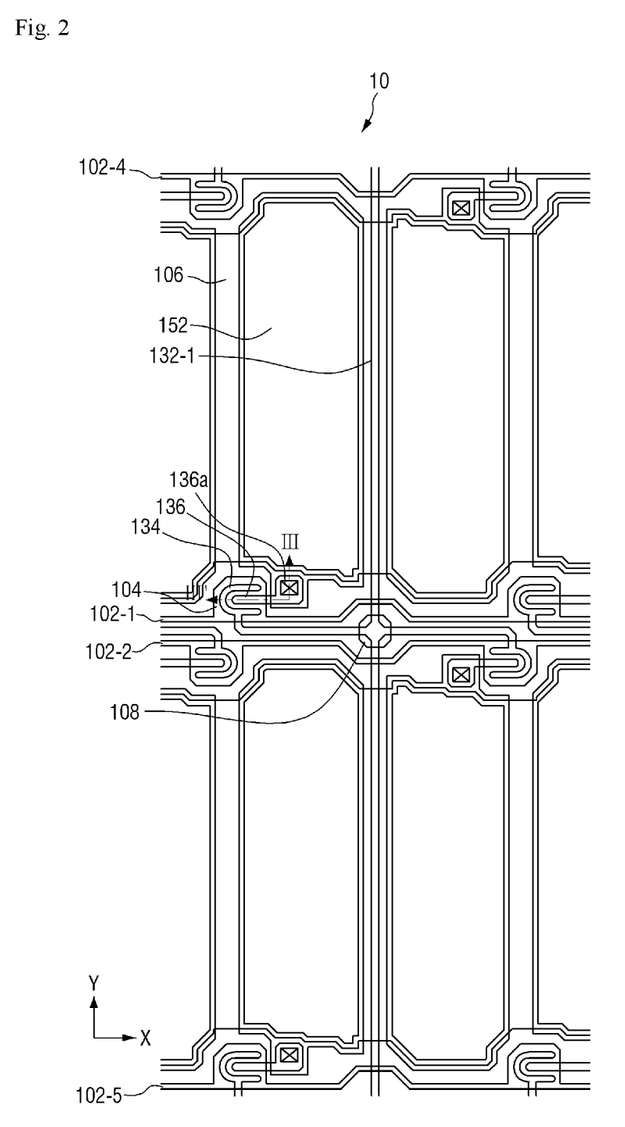
FIG. 2 is a plan diagram illustrating the LCD device according to the invention.
Figure 3:
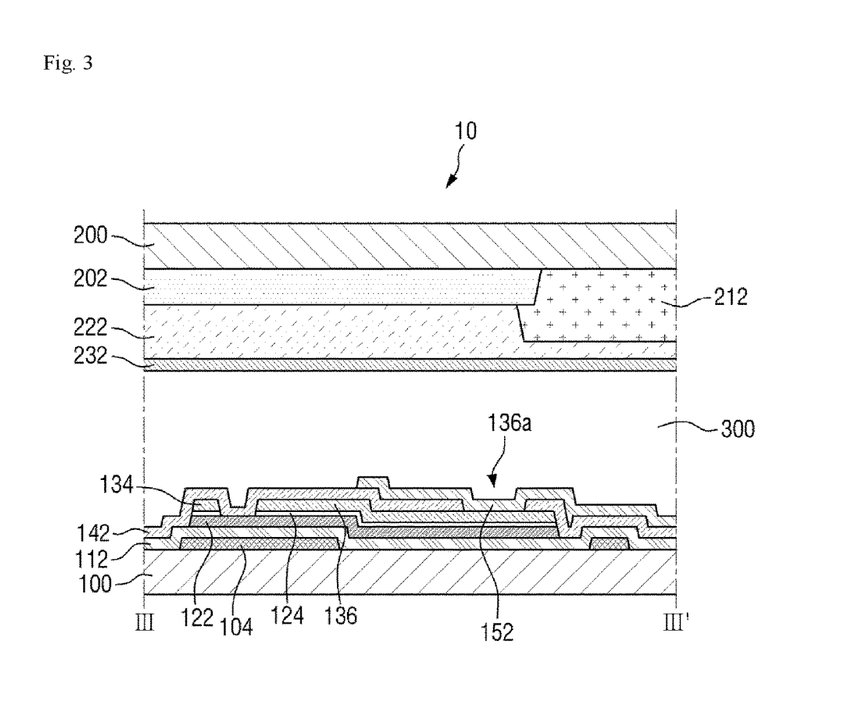
FIG. 3 is a cross-sectional view taken along line III-III' of FIG. 2.

FIG. 1 is a plan view illustrating a pixel structure of a liquid crystal display ("LCD") device according to an exemplary embodiment of the invention. FIG. 2 is a plan diagram illustrating the LCD device according to an exemplary embodiment of the invention. FIG. 3 is a cross-sectional view taken along line of FIG. 2.

Referring to FIGS. 1 to 3, an LCD device 10 according to an exemplary embodiment of the invention may include a first substrate 100 and a second substrate 200 facing each other, and a liquid crystal layer 300 interposed between the first substrate 100 and the second substrate 200.

In an exemplary embodiment, the first substrate 100 and the second substrate 200 may include an insulating material such as transparent glass, quartz, ceramic or silicon, and the insulating material may be selected appropriately as needed by a person skilled in the art. The first substrate 100 and the second substrate 200 may face each other.

In exemplary embodiments, the first substrate and the second substrate 200 may have flexibility. That is, the first substrate 100 and the second substrate 200 may be a transformable substrate which may be rolled, folded or bent.

A plurality of gate wires 102-1 to 102-6 and 104, and data wires 132-1 to 132-4, 134 and 136 may be disposed on the first substrate 100. In an exemplary embodiment, gate signals may be sequentially applied from the first gate wire 102-1 to the sixth gate line 102-6, for example.

The gate wires 102-1 to 102-6 and 104 may include a plurality of gate lines 102-1 to 102-6 and a plurality of gate electrodes 104. The data wires 132-1 to 132-4, 134 and 136 may include a plurality of data lines 132-1 to 132-4, a plurality of source electrodes 134, and a plurality of drain electrodes 136.

In an exemplary embodiment, the gate wires 102-1 to 102-6 and 104 and the data wires 132-1 to 132-4, 134 and 136 may include aluminum-based metal such as aluminum (Al) and aluminum alloy, silver-based metal such as silver (Ag) and silver alloy, copper-based metal such as copper (Cu) and copper alloy, molybdenum-based metal such as molybdenum (Mo) and molybdenum alloy, chrome (Cr), titanium (Ti), tantalum (Ta) and the like. Furthermore, the gate wires 102-1 to 102-6 and 104 and the data wires 132-1 to 132-4, 134 and 136 may have a multi-layer structure including two conductive layers (not shown) having different physical properties. In an exemplary embodiment, one conductive layer may include aluminum-based metal, silver-based metal, copper-based metal or the like, and the other conductive layer may include molybdenum-based metal, chrome, titanium, tantalum or the like. Examples of the layer combination may include a lower chrome layer and an upper aluminum layer, and a lower aluminum layer and an upper molybdenum layer. However, the invention is not limited thereto, and the gate wires 102-1 to 102-6 and 104 and the data wires 132-1 to 132-4, 134 and 136 may include various other metals and conductors.

Each of the gate lines 102-1 to 102-6 may extend along a boundary of pixels in a first direction (i.e., X direction), for example, a column direction, and each of the data lines 132-1 to 132-4 may extend along the boundary of pixels in a second direction (i.e., Y direction), for example, a row direction.

The gate lines 102-1 to 102-6 and the data lines 131-1 to 132-4 may intersect each other so as to define a plurality of pixel regions. Specifically, the plurality of pixel regions between odd-numbered gate lines 102-1, 102-3 and 102-5 and even-numbered gate lines 102-2, 102-4 and 102-6 may be defined in the first substrate 100 and the second substrate 200. A pixel electrode 152, which will be described later, may be disposed in each pixel region. More specifically, referring to FIGS. 1 and 2, the gate lines 102-1 to 102-6 may include a first gate line 102-1, a second gate line 102-2, a third gate line 102-3, a fourth gate line 102-4, a fifth gate line 102-5 and a sixth gate line 102-6, and pixel regions may be defined between the first gate line 102-1, which is an odd-numbered gate line, and the fourth gate line 102-4, which is an even-numbered gate line, and between the second gate line 102-2, which is an even-numbered gate line, and the fifth gate line 102-5, which is an odd-numbered gate line. However, a pixel region may not be disposed between the first gate line 102-1, which is an odd-numbered gate line, and the second gate line 102-2, which is an even-numbered gate line. That is, the pixel electrode 152 may not be disposed between the first gate line 102-1 and the second gate line 102-2. In other words, a first pixel region Px1 may be disposed in one side (e.g., upper side in the drawings) of the first gate line 102-1, and a second pixel region Px2 may be disposed in the other side (e.g., lower side in the drawings) of the second gate line 102-2, and the first pixel region Px1 and the second pixel region Px2 may be neighbored/adjacent to each other.

The region between the first gate line 102-1 and the second gate line 102-2 may overlap a light blocking pattern 202, which will be described later.

Referring to FIGS. 1 and 2, the gate lines 102-1 to 102-6 may be disposed in one side (e.g., upper side in the drawings) of the pixel region in the second direction (i.e., Y direction) and the other side (e.g., lower side in the drawings) opposite to the one side, and the data lines 132-1 to 132-4 may be disposed only in either one side of the pixel region in the first direction (i.e., X direction) or the other side opposed to the one side, and thus the pixel region may not be surrounded by the gate lines 102-1 to 102-6 and the data lines 132-1 to 132-4. That is, at least two pixel regions may be disposed between the adjacent data lines in the first direction.

The pixels may include respective TFTs TRs connected to the gate lines 102-2, 102-4 and 102-6, the data lines 132-1 to 132-4, and the pixel electrodes 152.

In exemplary embodiments, a plurality of pixels constituting a pixel matrix may be divided into a red pixel, a green pixel and a blue pixel. The plurality of pixels may be repeatedly arranged in order of the red pixel, the green pixel and the blue pixel along a column direction of the pixel matrix, and arranged such pixels of the same color may be repeated along a row direction of the pixel matrix.

In exemplary embodiments, the data lines 132-1 to 132-4 may be connected in a shared manner to the respective pixels in odd-numbered rows and to respective pixels in even-numbered rows disposed at both sides of each of the data lines 132-1 to 132-4. More specifically, referring to FIG. 1, the data lines 132-1 to 132-4 may be connected, through corresponding TFTs TRs, to the respective pixels in odd-numbered rows disposed in one side (for example, left side on the drawing) adjacent to the data lines 132-1 to 132-4, and connected, through corresponding TFTs TRs, to the respective pixels in even-numbered rows disposed in the other side (for example, right side on the drawing) adjacent to the data lines 132-1 to 132-4.

The pixels in odd-numbered rows and pixels in even-numbered rows connected to the data lines 132-1 to 132-4 may be connected to different gate lines 102-1 to 102-6 through corresponding TFTs TRs and may sequentially operate. In other words, each of red, green and blue pixels arranged in one horizontal line may be interposed between a pair of gate lines 102-1 to 102-6, that is, between an odd-numbered gate line and an even-numbered gate line (for example, between 102-1 and 102-4 or between 102-2 and 102-5), and connected to any one of the odd- or even-numbered gate lines 102-1 to 102-6. In this case, a pair of pixels, that is, the pixel in the odd-numbered row and the pixel in the even-numbered row, connected to the same data line 132-1 to 132-4 in the same column, may be connected to different gate lines 102-1 to 102-6 among the pair of gate lines 102-1 to 102-6 and may sequentially operate.

Thus, the number of the gate lines 102-1 to 102-6 may be doubled but the number of data lines 132-1 to 132-4 may be halved, thereby reducing the number of data ICs for driving the data lines 132-1 to 132-4.

At least one gate electrode 104 may be connected to each of the gate lines 102-1 to 102-6 for each pixel. The gate electrode 104 may be branched from the gate lines 102-1 to 102-6 toward a semiconductor layer 122, or provided by extending the gate lines 102-1 to 102-6. However, the invention is not limited thereto, and the gate electrode 104 may be defined in a region overlapping the semiconductor layer 122 on an extended path of the gate lines 102-1 to 102-6.

At least one source electrode 134 may be connected to each of the data lines 132-1 to 132-4 for each pixel. The source electrode 134 may be branched from the data lines 132-1 to 132-4 toward a semiconductor layer 122, or provided by extending the data lines 132-1 to 132-4. However, the invention is not limited thereto, and the source electrode 134 may be defined in a region overlapping the semiconductor layer 122 on an extended path of the data lines 132-1 to 132-4. In an exemplary embodiment, the source electrode 134 may be disposed on the line substantially the same as the data lines 132-1 to 132-4 rather than being protruded from the data lines 132-1 to 132-4. The drain electrode 136 may be spaced apart from the source electrode 134 with reference to the semiconductor layer 122, and electrically connected to the pixel electrode 152 through a contact hole 136a penetrating through a passivation layer 142.

A gate insulation layer 112 may be interposed between the gate lines 102-1 to 102-6 and 104 and the data lines 132-1 to 132-4, 134 and 136. In an exemplary embodiment, the gate insulation layer 112 may be disposed on the gate lines 102-1 to 102-6 and 104, and the data lines 132-1 to 132-4, 134 and 136 may be disposed on the gate insulation layer 112. In an exemplary embodiment, the gate insulation layer 112 may include, for example, silicon nitride (SiNx), silicon oxide (SiO2), silicon oxynitride (SiON) or a laminated film thereof. The gate insulation layer 112 may serve to maintain insulation between conductive thin films such as the gate lines 102-1 to 102-6 and 104 and data lines 132-1 to 132-4 disposed on the gate lines.

The semiconductor layer 122 may be disposed on the gate insulation layer 112, and including, for example, hydrogenated amorphous silicon, polycrystalline silicon or the like. The semiconductor layer 122 may at least partially overlap the gate electrode 104. The semiconductor layer may constitute a thin film transistor ("TFT") together with the gate electrode 104, the source electrode 134 and the drain electrode 136.

The semiconductor layer 122 may have various shapes such as an island or a line, and FIG. 2 illustrates an example of the semiconductor layer 122 having a line shape, but the invention is not limited thereto. When the semiconductor layer 122 has a line shape, the semiconductor layer 122 may overlap the data wiring 132-1 to 132-4, 134 and 136.

In an exemplary embodiment, an ohmic contact layer 124 including n+ hydrated amorphous silicon or the like, which is highly doped with n-type impurities, may be disposed on the semiconductor layer 122. The ohmic contact layer 124 may be interposed between the semiconductor layer 122 below the ohmic contact layer 124, and the source electrode 134 and the drain electrode 136 above the ohmic contact layer 124 so as to reduce contact resistance. Like the semiconductor layer 122, the ohmic contact layer 124 may have various shapes such as an island or a line. When the semiconductor layer 122 has a line shape, the ohmic contact layer 124 may also have a line shape, and when the semiconductor layer 122 has an island shape, the ohmic contact layer 124 may also have an island shape, for example. Unlike the semiconductor layer 122, since portions of the ohmic contact layer 124 corresponding to the source electrode 134 and the drain electrode 136 which face each other and are spaced apart from each other are separated, the semiconductor layer 122 below the ohmic contact layer 124 may be exposed. A channel may be defined in a portion of the first semiconductor layer 122 corresponding to the space between the source electrode 134 and the drain electrode 136 spaced apart from each other.

When a gate on signal is applied to the gate electrode 104 and a channel is defined in the semiconductor layer 122, a TFT may be turned on and the drain electrode 136 may receive a data signal from the source electrode 134 and transmit the received data signal to the pixel electrode 152.

The passivation layer 142 may be disposed on the data wiring 132-1 to 132-4, 134 and 136 and the exposed semiconductor layer 122. The contact hole 136a which exposes at least a part of the drain electrode 136 may be defined in the passivation layer 142. At least a part of the drain electrode 136 exposed through the contact hole 136a may contact the pixel electrode 152. Thus, the drain electrode 136 and the pixel electrode 152 may be electrically connected/contact with each other.

In an exemplary embodiment, the passivation layer 142 may include, for example, inorganic materials such as silicon nitride or silicon oxide, or materials such as a-Si:C:O and a-Si:O:F provided through a plasma enhanced chemical vapor deposition ("PECVD").

The pixel electrode 152 may be disposed for each unit pixel on the passivation layer 142. A part of the pixel electrode 152 may be disposed within the contact hole 136*a*. The part of the pixel electrode 152 disposed within the contact hole 136*a* may contact the drain electrode 136 so as to be electrically connected to the drain electrode 136.

When a data voltage is applied to the pixel electrode 152 through the contact hole 136*a*, the pixel electrode 152 may cooperate with ae common electrode 232 to generate an electric field, which rotates the liquid crystal molecules in the liquid crystal layer 300. In an exemplary embodiment, the pixel electrode 152 may include a transparent conductive material such as indium tin oxide ("ITO") or indium zinc oxide ("IZO"), but the invention is not limited thereto.

In exemplary embodiments, a sustain electrode 106 may be disposed on the first substrate 100. A predetermined voltage may be applied to the sustain electrode 106. In an exemplary embodiment, a voltage same as the voltage applied to the common electrode 232 may be applied to the sustain electrode 106, the invention is not limited thereto.

The sustain electrode 106 may overlap at least a part of the pixel electrode 152. In exemplary embodiments, the sustain electrode 106 may be overlap an edge of the pixel electrode 152 as illustrated in the exemplary embodiment of FIG. 2. The sustain electrode 106 may be disposed in a boundary region of pixels. As illustrated in the exemplary embodiment of FIG. 2, the sustain electrode 106 may be overlap the data lines 132-1 to 132-4.

In exemplary embodiments, the sustain electrode 106 may be disposed in the same layer and including the same material as the gate wiring 102-1 to 102-6 and 104. However, this is merely exemplary, and the disposal of the sustain electrode 106 may not be limited thereto.

In exemplary embodiments, the sustain electrode 106 may be disposed in one side (e.g., upper side of FIG. 2) of the first gate line 102-1 in the second direction (i.e., Y direction) and the other side (e.g., lower side of FIG. 2) of the second gate line 102-2 in the second direction (i.e., Y direction).

The light blocking pattern 202, a color filter 212, an overcoat layer 222, the common electrode 232 and a column spacer 242 (refer to FIG. 5) may be disposed on the second substrate 200.

The light blocking pattern 202 may be disposed on the second substrate 200. The light blocking pattern 202 may serve to prevent light leakage. The light blocking pattern 202 may be disposed in a TFT TR region and a non-pixel region (between pixels, a gate line region and a data line region). The light blocking pattern 202 may be provided along an edge of pixels so as to expose a pixel region. In an exemplary embodiment, the light blocking pattern 202 may be a lattice type pattern, for example.

The light blocking pattern 202 may include a material which blocks transmission of incident light. Light blocking effect may be obtained by reflecting or absorbing incident light. In an exemplary embodiment, the light blocking pattern 202 may include metal having high reflectivity such as chrome so as to provide a light blocking effect, for example. In an alternative exemplary embodiment, the light blocking pattern 202 may be an organic layer (black organic layer) which includes a material such as black dye or pigment and absorbs the greater part of incident light, thereby providing a light blocking effect. In exemplary embodiments, the light blocking pattern 202 may be a stacked film of a metal layer and a black organic layer.

In exemplary embodiments, the light blocking pattern 202 may overlap first region 102*a* between the first gate line 102-1 and the second gate line 102-2. Specifically, the light blocking pattern 202 may overlap the whole of the first region 102*a*. However, this is merely exemplary, and the invention is not limited thereto. In an exemplary embodiment, the color filter 212 may be an organic layer including dye or pigment for displaying each color. The color filter 212 may occupy the pixel region. In an exemplary embodiment, the color filter 212 may include a red color filter, a green color filter and a blue color filter, for example. The red color filter, the green color filter and the blue color filter may be disposed in the respective pixels so as to form red, green and blue pixels. However, the invention is not limited thereto, and color filter 212 may include various other colors. The color filter 212 may be disposed to overlap the pixel electrode 152.

The color filter 212 may be disposed on the light blocking pattern 202. Specifically, a part of the color filter 212 may be extended to the light blocking pattern 202 disposed at a pixel boundary and overlapping the light blocking pattern 202.

The overcoat layer 222 may be disposed on the color filter 212. The overcoat layer 222 may be a transparent organic layer. The overcoat layer 222 may be disposed on the color filter 212 so as to planarize steps of the red color filter, the green color filter and the blue color filter.

The common electrode 232 may be disposed on the overcoat layer 222. The common electrode 232 may receive a common voltage and cooperate with the pixel electrode 152 so as to generate an electric field and control an alignment direction of liquid crystal molecules in the liquid crystal layer 300.

The common electrode 232 may be a unitary body all over the whole pixel region. In an exemplary embodiment, the common electrode 232 may include a transparent conductive material such as ITO or IZO, but the invention is not limited thereto. Although not shown in the drawings, alignment layers may be disposed respectively on one surface of the first substrate 100 and one surface of the second substrate 200 facing the liquid crystal layer 300. In an exemplary embodiment, the alignment layers may include resinous polymer such as polyimide, polyamic acid, polyamide, polyamic imide, polyester, polyethylene, polyurethane or polystyrene, or any combinations thereof. Furthermore, the alignment layers may include monomers of the resinous polymer.

The liquid crystal layer 300 may be interposed between the first substrate 100 and the second substrate 200. The liquid crystal layer 300 may include a plurality of liquid crystal molecules having dielectric anisotropy. The liquid crystal molecules may be vertically aligned liquid crystal molecules aligned between the first substrate 100 and the second substrate 200 in a direction vertical to the two substrates 100 and 200. When an electric field is applied between the first substrate 100 and the second substrate 200, the liquid crystal molecules rotate in a certain direction between the first substrate 100 and the second substrate 200, thereby transmitting or blocking light. The term "rotate" as used herein may not only mean that the liquid crystal molecules actually rotate but also mean that the alignment of the liquid crystal molecules changes by the electric field. In exemplary embodiments, the liquid crystal layer 300 may include reactive mesogen which undergoes polymerization reaction by light such as ultraviolet rays, or may include a pre-tilt providing polymer produced by a polymerization reaction of reactive mesogen. The pre-tilt providing polymer may provide pre-tilt to the liquid crystal molecules even in the state where no electric field is generated between the first substrate 100 and the second substrate 200.

A thickness of the liquid crystal layer interposed between the first substrate 100 and the second substrate 200 is referred to as a cell gap, and the cell gap may influence overall operating characteristics of the LCD device 10 such as response speed, contrast ratio, viewing angle and luminance uniformity. A non-uniformity of the cell gap may prevent an image from being uniformly displayed all over the whole surface of a screen, thus causing image quality defects. Therefore, the LCD device 10 according to an exemplary embodiment of the invention includes a column spacer to maintain a uniform cell gap throughout the whole surface of the first and second substrates 100 and 200.

Figure 4:
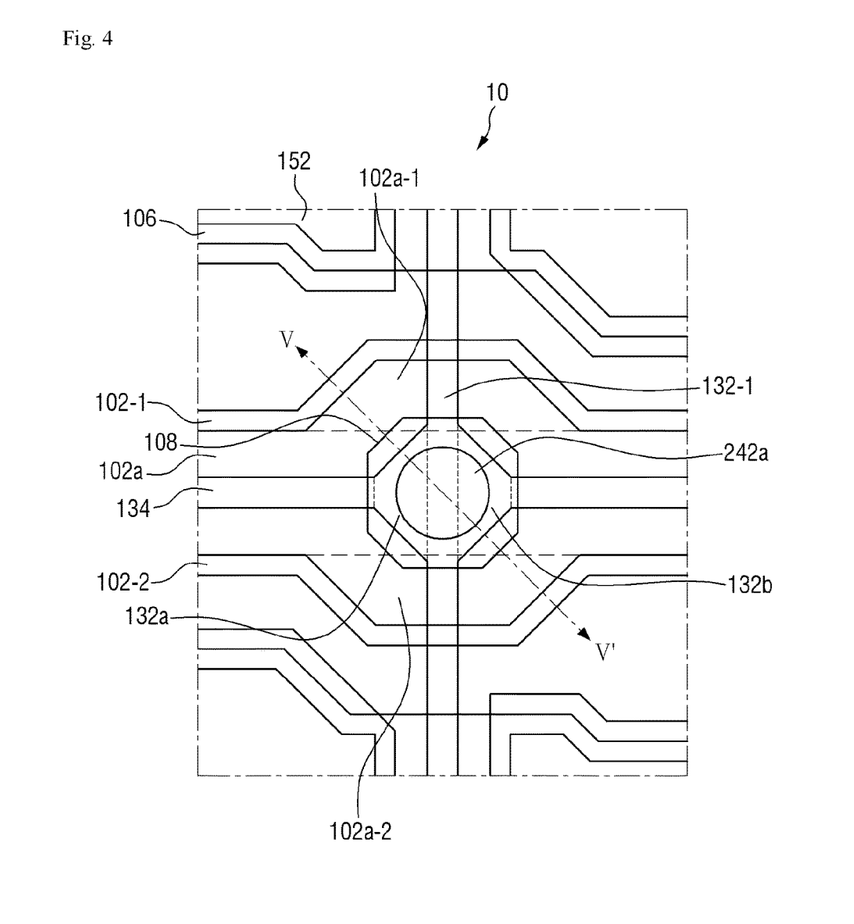
FIG. 4 is a plan view illustrating an exemplary embodiment of a seating surface of a column spacer of the LCD device according to the invention.
Figure 5:
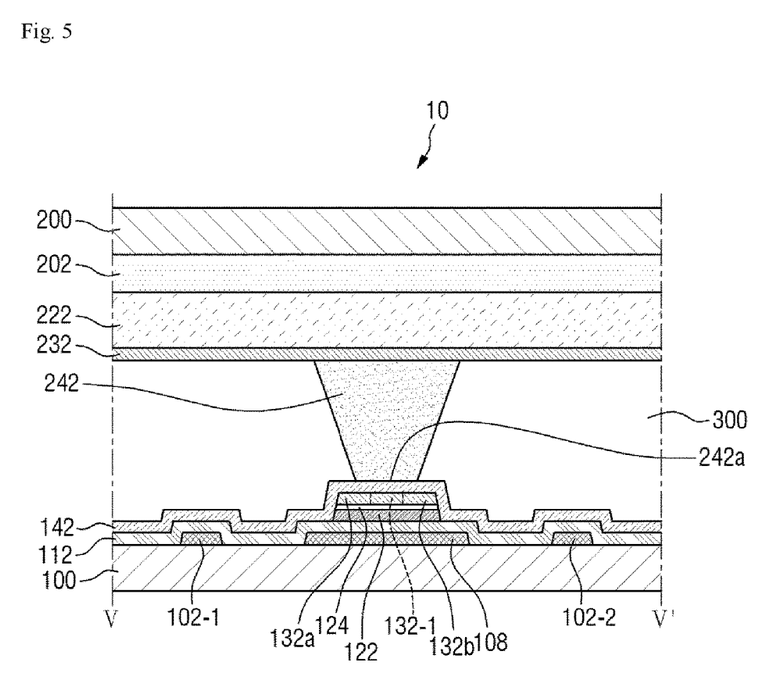
FIG. 5 is a cross-sectional view taken along line V-V' of FIG. 4.

FIG. 4 is a plan view illustrating a seating surface of a column spacer of the LCD device according to an exemplary embodiment of the invention. FIG. 5 is a cross-sectional view taken along line V-V of FIG. 4.

Referring to FIGS. 4 and 5, the column spacer 242 functions to maintain spacing between the first substrate 100 and the second substrate 200, and in exemplary embodiments, the column spacer 242 may be disposed on the second substrate 200. More specifically, the column spacer 242 may be disposed on the common electrode 232. An end of the column spacer 242 may contact the common electrode 232 as illustrated in the exemplary embodiment of FIG. 5. However, the invention is not limited thereto.

Although not shown in the drawings, the column spacer 242 may include a plurality of column spacers having different steps. In an exemplary embodiment, the column spacer 242 may include a main column spacer having relatively higher steps, and a sub-column spacer having relatively lower steps. In this case, the spacing between the first substrate 100 and the second substrate 200 may be maintained primarily by the main column spacer, and secondarily by the sub-column spacer when the main column spacer does not properly maintain the space.

In an exemplary embodiment, the column spacer 242 may include a light blocking pigment, and may include a material same as that of the light blocking pattern 202. However, this is merely exemplary, and the invention is not limited thereto.

In general, the LCD device 10 is manufactured by disposing the liquid crystal layer 300 on the first substrate 100 and bonding the first substrate 100 and the second substrate 200 to each other. When misalignment occurs during the process of bonding the first substrate 100 and the second substrate 200 to each other, a surface of the first substrate 100 or the second substrate 200 on which a column spacer is seated becomes non-uniform and thus a cell gap difference may occur between the first substrate 100 and the second substrate 200. To prevent the cell gap difference, an area of the surface on which the column spacer is seated may be widened, which, however, may cause reduction of an aperture area of a pixel and thus reduced aperture ratio.

The LCD device 10 according to an exemplary embodiment of the invention may include a first seat part 108 and a second seat part 132*a* and 132*b* at least partially overlapping a seating surface 242*a* of the column spacer 242 so as to minimize reduction of an aperture ratio and ensure a stable seating surface for the column spacer 242. The first seat part 108 may be disposed in the first region 102*a* between the first gate line 102-1 and the second gate line 102-2, and may at least partially overlap the data line 132-1. The second seat part 132*a* and 132*b* may be disposed on the first seat part 108, and may at least partially overlap the first seat part 108. The first seat part 108 and the second seat part 132*a* and 132*b* may be disposed in a non-pixel region, that is, the first region 102*a* between the first gate line 102-1 and the second gate line 102-2 in which the pixel electrode 152 is not disposed, thereby minimizing an influence of the disposal of the first seat part 108 and the second seat part 132*a* and 132*b* on an aperture ratio. Furthermore, as shown in FIGS. 4 and 5, the first seat part 108 or the second seat part 132*a* and 132*b* between which the data line 132-1 is disposed may be wider than the seating surface 242*a* of the column spacer 242, thereby enabling the column spacer 242 to be stably seated.

In exemplary embodiments, the first seat part 108 may be disposed in the same layer as the gate lines 102-1 to 102-6, and the second seat part 132*a* and 132*b* may be disposed in the same layer as the data lines 132-1 to 132-4, as illustrated in the exemplary embodiment of FIG. 5. However, this is merely exemplary, and the invention is not limited thereto.

In exemplary embodiments, the first seat part 108 may be spaced apart from the first gate line 102-1 and the second gate line 102-2 as illustrated in the exemplary embodiment of FIG. 4. That is, the first seat part 108 may be separated from the first gate line 102-1 and the second gate line 102-2. That is, the first seat part 108 may be an island shape.

In exemplary embodiments, the first seat part 108 may have an octagonal shape in a plan view as illustrated in the exemplary embodiment of FIG. 4, but this is merely exemplary, and the first seat part 108 may have various other shapes including a polygonal shape such as a quadrangle, a circular shape or an elliptical shape in a plan view.

In exemplary embodiments, the second seat part 132*a* and 132*b* may be unitary with the data line 132-1. That is, the second seat part 132*a* and 132*b* may be branched/extended from the data line 132-1. However, this is merely exemplary, and the invention is not limited thereto.

In exemplary embodiments, the second seat part 132*a* and 132*b* may include a 2-1st seat part 132*a* and a 2-2nd seat part 132*b*. The 2-1st seat part 132*a* may be branched toward one side in the first direction (i.e., X direction) from the data line 132-1, and the 2-2nd seat part 132*b* may be branched toward the other side opposite to the one side from the data line 132-1. However, this is merely exemplary, and only one of the 2-1st seat part 132*a* and the 2-2nd seat part 132*b* may be provided in other exemplary embodiments.

In exemplary embodiments, the source electrode 134 may be branched toward one side in the first direction (i.e., X direction) from the second seat part 132*a* and 132*b* and toward the other side opposite to the one side as illustrated in the exemplary embodiment of FIG. 4. Specifically, the source electrode 134 may be branched toward one side in the first direction (i.e., X direction) from the 2-1st seat part 132*a*. The source electrode 134 may be branched toward the other side in the first direction (i.e., X direction) from the 2-2nd seat part 132*b*.

The first region 102*a* between the first gate line 102-1 and the second gate line 102-2 may extend in the first direction (i.e., X direction). In exemplary embodiments, the first region 102*a* between the first gate line 102-1 and the second gate line 102-2 may include extended regions 102*a*-1 and 102*a*-2 disposed in at least either one side in the second direction (i.e., Y direction) or the other side opposite to the one side. The second signal line 132-1 may traverse the extended regions 102*a*-1 and 102*a*-2.

In exemplary embodiments, the extended regions 102a-1 and 102a-2 may include a first extended region 102a-1 and a second extended region 102a-2 as illustrated in the exemplary embodiment of FIG. 4. The first extended region 102a-1 may be disposed in one side in the second direction (i.e., Y direction), and the second extended region 102a-2 may be disposed in the other side in the second direction (i.e., Y direction). Thus, the first region 102a may be partially extended. However, this is merely exemplary, and the first region 102a may include only one of the first extended region 102a-1 and the second extended region 102a-2.

In exemplary embodiments, the extended regions 102a-1 and 102a-2 may at least partially overlap the first seat part 108 as illustrated in the exemplary embodiment of FIG. 4. Furthermore, the extended regions 102a-1 and 102a-2 may at least partially overlap the second seat part 132a and 132b. Although not shown in the drawings, the extended regions 102a-1 and 102a-2 may at least partially overlap the seating surface 242a of the columns spacer 242.

In exemplary embodiments, the second seat part 132a and 132b may be disposed inside the first seat part 108. Specifically, an area of the first seat part 108 may be larger than an area of the second seat part 132a and 132b in a plan view, and the second seat part 132a and 132b may be disposed inside the first seat part 108 and completely overlap the first seat part 108. However, this is merely exemplary, and the area of the second seat part 132a and 132b in a plan view may be substantially the same as or larger than the area of the first seat part 108 in a plan view.

In exemplary embodiments, the seating surface 242a of the columns spacer 242 may be disposed inside the second seat part 132a and 132b and the data line 132-1 as illustrated in the exemplary embodiment of FIG. 4. That is, the seating surface 242a of the columns spacer 242 may be disposed inside the second seat part 132a and 132b and the data line 132-1 and completely overlap the second seat part 132a and 132b and the data line 132-1. The seating surface 242a of the columns spacer 242 may be disposed inside the first seat part 108. However, this is merely exemplary, and the invention is not limited thereto.

In exemplary embodiments, the seating surface 242a of the columns spacer 242 may have a circular shape in a plan view as illustrated in the exemplary embodiment of FIG. 4. However, this is merely exemplary, and the seating surface 242a of the columns spacer 242 may have a polygonal shape such as a quadrangle or an elliptical shape in a plan view.

In exemplary embodiments, the data line 132-1 may traverse the seating surface 242a of the columns spacer 242 as illustrated in the exemplary embodiment of FIG. 4. Specifically, the data line 132-1 may traverse the center of the seating surface 242a of the columns spacer 242. However, this is merely exemplary, and the invention is not limited thereto.

Figure 6:
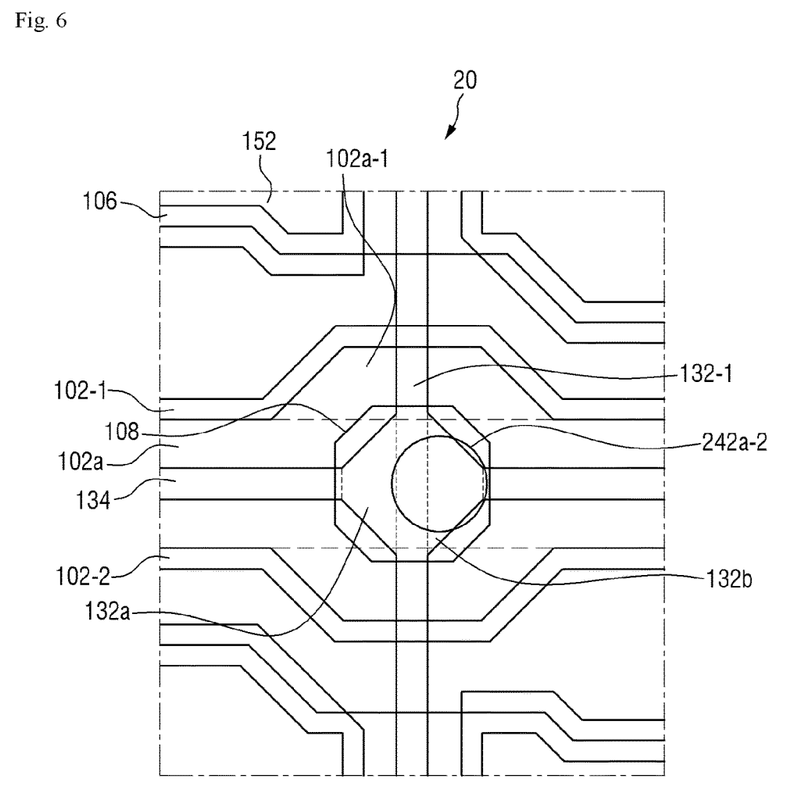
FIG. 6 is a plan view illustrating another exemplary embodiment of a seating surface of a column spacer of an LCD device according to the invention.

FIG. 6 is a plan view illustrating a seating surface of a column spacer of an LCD device according to another exemplary embodiment of the invention.

Referring to FIG. 6, an LCD device 20 according to another exemplary embodiment of the invention differs from the LCD device 10 described above with reference to FIGS. 1 to 5 with respect to the structure of a seating surface 242a-2 of the columns spacer 242, and other components may be same as or similar to those of the LCD device 10. Hereinafter, duplicate description will be omitted and description will be made mainly on differences.

The seating surface 242a-2 of the columns spacer 242 illustrated in the exemplary embodiment of FIG. 6 is depicted as being moved to the right on the drawing as compared with the seating surface 242a of the columns spacer 242 of the LCD device 10 described above with reference to FIGS. 1 to 5. Thus, a part of the seating surface 242a-2 of the columns spacer 242 may be disposed outside the second seat part 132a or 132b. That is, the part of the seating surface 242a-2 of the columns spacer 242 may not overlap the second seat part 132a or 132b.

Figure 7:
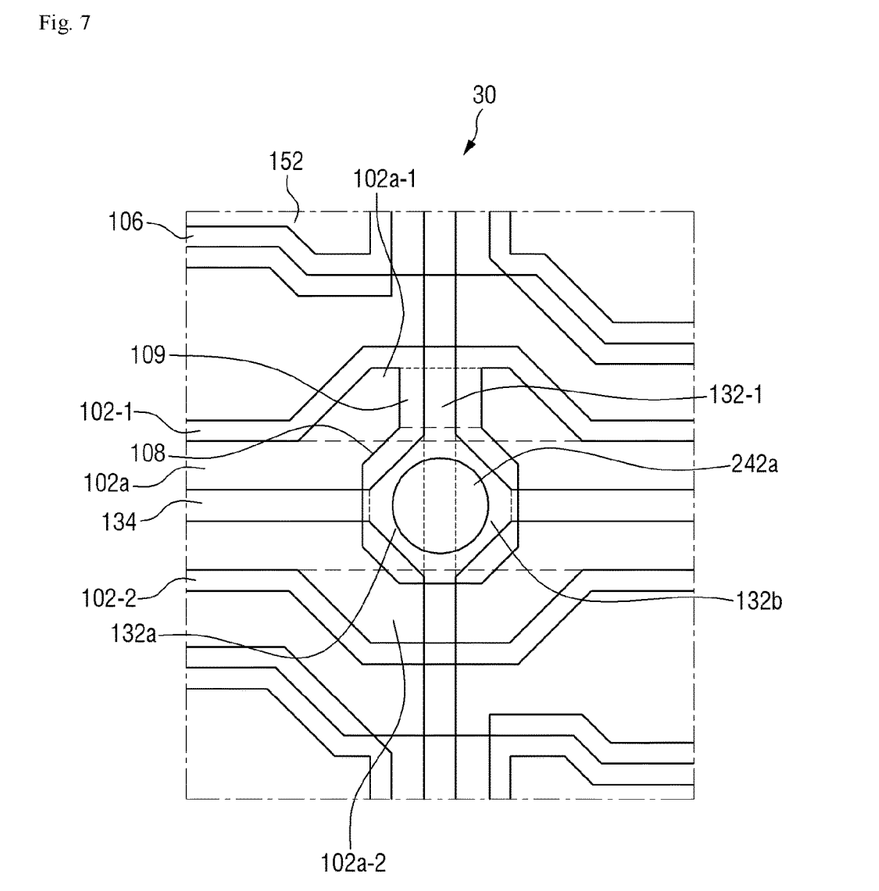
FIGS. 7 to 9 are plan views illustrating other exemplary embodiments of a seating surface of a column spacer of an LCD device according to the invention.

FIG. 7 is a plan view illustrating a seating surface of a column spacer of an LCD device according to another exemplary embodiment of the invention.

Referring to FIG. 7, an LCD device 30 according to another exemplary embodiment of the invention differs from the LCD device 10 described above with reference to FIGS. 1 to 5 with respect to the structure of a connection part 109, and other components may be same as or similar to those of the LCD device 10. Hereinafter, duplicate description will be omitted and description will be made mainly on differences.

The LCD device 30 according to another exemplary embodiment of the invention may further include the connection part 109 as compared with the LCD device 10 described above with reference to FIGS. 1 to 5. The connection part 109 may be disposed in the same layer as the gate line 102-1. The connection part 109 may have one end in the second direction (i.e., Y direction) connected to the gate line 102-1, and the other end in the second direction (i.e., Y direction) connected to the first seat part 108. Thus, the gate line 102-1, the connection part 109 and the first seat part 108 may be electrically connected. However, this is merely exemplary, and the connection part 109 may be connected to the second gate line 102-1 and the first seat part 108 in other exemplary embodiments.

Figure 8:
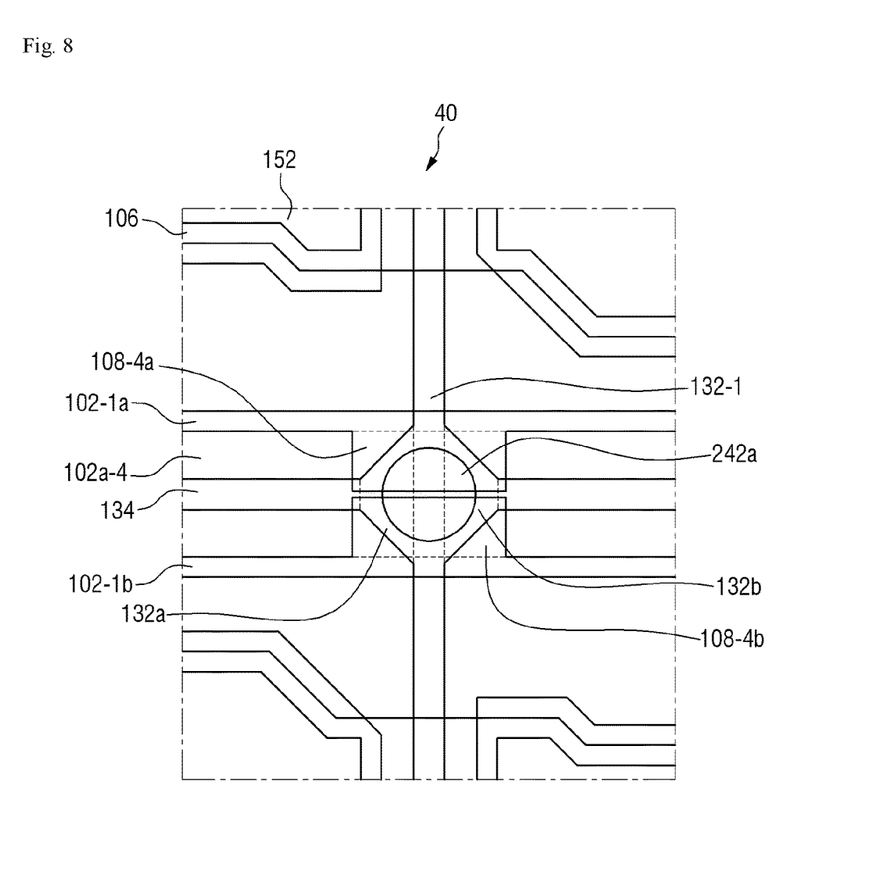

FIG. 8 is a plan view illustrating a seating surface of a column spacer of an LCD device according to another exemplary embodiment of the invention.

Referring to FIG. 8, an LCD device 40 according to an exemplary embodiment of the invention differs from the LCD device 10 described above with reference to FIGS. 1 to 5 with respect to the structure of a first seat part 108-4a and 108-4b, and other components may be same as or similar to those of the LCD device 10. Hereinafter, duplicate description will be omitted and description will be made mainly on differences.

In the exemplary embodiment illustrated in FIG. 8, the first seat part 108-4a and 108-4b may include a 1-1st seat part 108-4a and a 1-2nd seat part 108-4b. The 1-1st seat part 108-4a may be branched toward the other side (downward on the drawing) in the second direction (i.e., Y direction) from a first gate line 102-1a, and the 1-2nd seat part 108-4b may be branched toward one side (upward on the drawing) in the second direction (i.e., Y direction) from a second gate line 102-1b. The 1-1st seat part 108-4a may be electrically connected to the first gate line 102-1a, and the 1-2nd seat part 108-4b may be electrically connected to the second gate line 102-1b. However, this is merely exemplary, and the invention is not limited thereto.

The 1-1st seat part 108-4a and the 1-2nd seat part 108-4b may be spaced apart from each other by a predetermined spacing. Thus, the 1-1st seat part 108-4a and the 1-2nd seat part 108-4b may be electrically separated from each other. In an exemplary embodiment, the 1-1st seat part 108-4a and the 1-2nd seat part 108-4b may be spaced apart from each other by a predetermined spacing in the second direction (i.e., Y direction) as illustrated in the exemplary embodiment of FIG. 8. However, this is merely exemplary, and the 1-1st seat part 108-4a and the 1-2nd seat part 108-4b may be spaced apart from each other by a predetermined spacing in the first direction (i.e., X direction) in other exemplary embodiments.

A first region 102a-4 between the first gate line 102-1a and the second gate line 102-1b of the LCD device 40 according to another exemplary embodiment of the invention may not include the extended regions 102a-1 and 102a-2 of the first region 102a of the LCD device 10 described above with reference to FIGS. 1 to 5. Thus, a width of the first region 102a-4 in the second direction (i.e., Y direction) may be constant.

Figure 9:
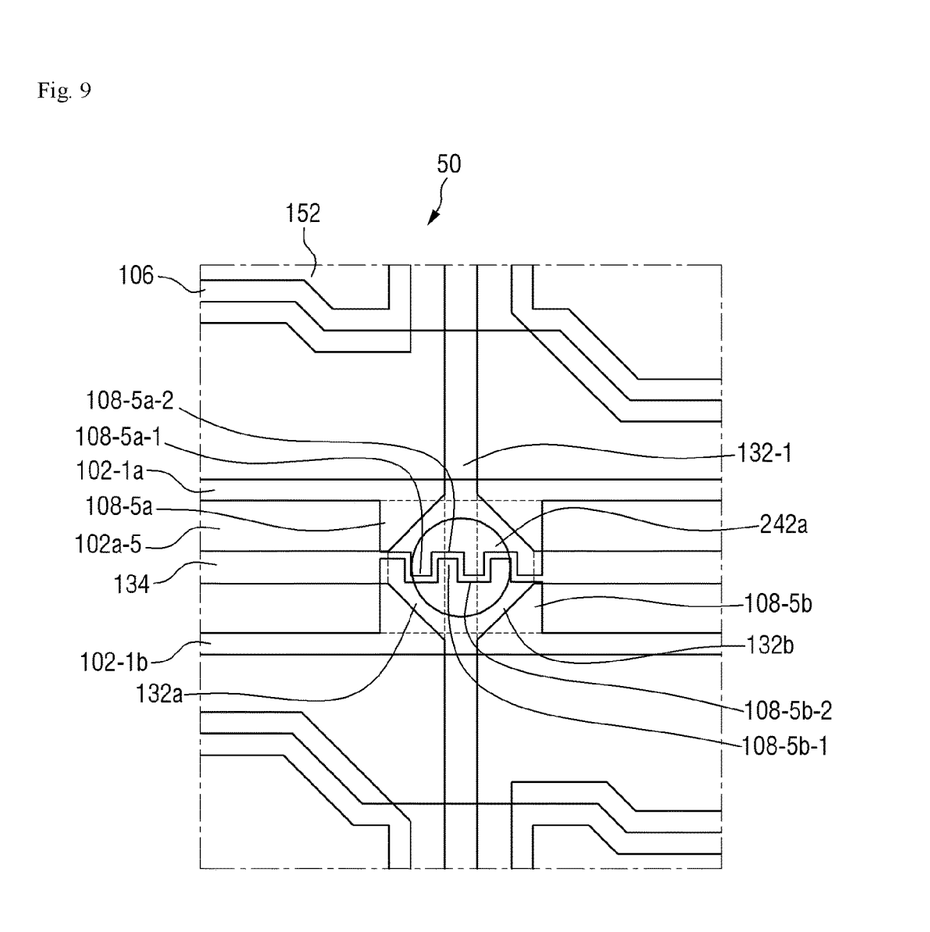

FIG. 9 is a plan view illustrating a seating surface of a column spacer of an LCD device according to another exemplary embodiment of the invention.

Referring to FIG. 9, an LCD device 50 according to an exemplary embodiment of the invention differs from the LCD device 40 described above with reference to FIG. 8 with respect to the structure of a first seat part 108-5a and 108-5b, and other components may be same as or similar to those of the LCD device 40. Hereinafter, duplicate description will be omitted and description will be made mainly on differences.

In the exemplary embodiment illustrated in FIG. 9, the first seat part 108-5a and 108-5b may include a 1-1st seat part 108-5a and a 1-2nd seat part 108-5b. The 1-1st seat part 108-5a may be branched toward the other side (downward on the drawing) in the second direction (i.e., Y direction) from the first gate line 102-1a, and the 1-2nd seat part 108-5b may be branched toward one side (upward on the drawing) in the second direction (i.e., Y direction) from the second gate line 102-1b. The 1-1st seat part 108-5a may be electrically connected to the first gate line 102-1a, and the 1-2nd seat part 108-5b may be electrically connected to the second gate line 102-1b. However, this is merely exemplary, and the invention is not limited thereto.

The 1-1st seat part 108-5a and the 1-2nd seat part 108-5b may be spaced apart from each other by a predetermined spacing. Thus, the 1-1st seat part 108-5a and the 1-2nd seat part 108-5b may be electrically separated from each other.

The 1-1st seat part 108-5a may further include a first protrusion 108-5a-1, and a first recess 108-5a-2 may be defined in the 1-1st seat part 108-5a at the other end thereof in the second direction (i.e., Y direction). The 1-2nd seat part 108-5b may further include a second protrusion 108-5b-1, and a second recess 108-5b-2 may be defined in the 1-2nd seat part 108-5b at one end thereof in the second direction (i.e., Y direction). The first protrusion 108-5a-1 and the second recess 108-5b-2 may face each other, and the second protrusion 108-5b-1 and the first recess 108-5a-2 may face each other. Thus, as illustrated in the exemplary embodiment of FIG. 9, the region between the 1-1st seat part 108-5a and the 1-2nd seat part 108-5b may be zigzag-shaped in a plan view.

A first region 102a-5 between the first gate line 102-1a and the second gate line 102-1b of the LCD device 50 according to the exemplary embodiment of the invention may not include the extended regions 102a-1 and 102a-2 of the first region 102a of the LCD device 10 described above with reference to FIGS. 1 to 5. Thus, a width of the first region 102a-5 in the second direction (i.e., Y direction) may be constant.

However, the effects of the invention are not restricted to the one set forth herein. The above and other effects of the invention will become more apparent to one of daily skill in the art to which the invention pertains by referencing the claims.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A liquid crystal display device comprising:
a first substrate and a second substrate facing each other;
a liquid crystal layer interposed between the first substrate and the second substrate;
a first signal line disposed on the first substrate and including a 1-1st signal line and a 1-2nd signal line extending in a first direction;
a second signal line disposed on the first signal line, and extending in a second direction perpendicular to the first direction, and intersecting the 1-1st signal line and the 1-2nd signal line;
a pixel electrode disposed in a pixel region of the first substrate;
a first seat part disposed on the first substrate, and disposed only in a first region between the 1-1st signal line and the 1-2nd signal line, and at least partially overlapping the second signal line;
a second seat part disposed on the first seat part and overlapping at least a part of the first seat part; and
a column spacer disposed on the second substrate and including a seating surface at least partially overlapping the second seat part,
wherein the pixel electrode is disposed outside a region between the 1-1st signal line and the 1-2nd signal line.

2. A liquid crystal display device comprising:
a first substrate and a second substrate facing each other;
a liquid crystal layer interposed between the first substrate and the second substrate;
a first signal line disposed on the first substrate and including a 1-1st signal line and a 1-2nd signal line extending in a first direction;
a second signal line disposed on the first signal line, and extending in a second direction perpendicular to the first direction, and intersecting the 1-1st signal line and the 1-2nd signal line;
a pixel electrode disposed in a pixel region of the first substrate;
a first seat part disposed on the first substrate, and disposed in a first region between the 1-1st signal line and the 1-2nd signal line, and at least partially overlapping the second signal line;
a second seat part disposed on the first seat part and overlapping at least a part of the first seat part; and
a column spacer disposed on the second substrate and including a seating surface at least partially overlapping the second seat part,
wherein the pixel electrode is disposed outside a region between the 1-1st signal line and the 1-2nd signal line,
wherein the first seat part is disposed in a same layer as the first signal line, and the second seat part is disposed in a same layer as the second signal line.

3. The liquid crystal display device of claim 1, wherein the first seat part is spaced apart from the 1-1st signal line and the 1-2nd signal line, and the second seat part is unitary with the second signal line.

4. The liquid crystal display device of claim 3, wherein the second seat part includes a 2-1st seat part branched from the second signal line toward one side in the first direction, and a 2-2nd seat part branched from the second signal line toward another side opposite to the one side in the first direction.

5. The liquid crystal display device of claim 3, wherein the first region includes an extended region disposed in at least one of one side and another side opposite to the one side in the second direction, and the second signal line traverses the extended region.

6. The liquid crystal display device of claim 5, wherein the first seat part overlaps at least a part of the extended region.

7. The liquid crystal display device of claim 1, wherein the second seat part and the seating surface are disposed inside the first seat part.

8. The liquid crystal display device of claim 1, wherein the seating surface has a circular shape in a plan view.

9. The liquid crystal display device of claim 1, wherein the second signal line traverses the seating surface.

10. The liquid crystal display device of claim 1, wherein a part of the seating surface is disposed outside the second seat part and the second signal line.

11. The liquid crystal display device of claim 1, wherein the first signal line is a gate line and the second signal line is a data line.

12. The liquid crystal display device of claim 11, further comprising a source electrode branched from the second seat part toward one side in the first direction and toward another side opposite to the one side in the first direction.

13. The liquid crystal display device of claim 11, further comprising:
 a sustain electrode disposed in a same layer as the first signal line; and
 a pixel electrode disposed on the second signal line,
 wherein at least a part of the sustain electrode overlaps the pixel electrode, and the sustain electrode is disposed in one side of the 1-1st signal line in the second direction and another side of the 1-2nd signal line.

14. The liquid crystal display device of claim 1, further comprising a light blocking pattern disposed on the second substrate, wherein the light blocking pattern overlaps a region between the 1-1st signal line and the 1-2nd signal line.

15. The liquid crystal display device of claim 1, wherein the first signal line is disposed in one side of the pixel region in the second direction and another side opposite to the one side in the second direction, and the second signal line is disposed only in either one side of the pixel region in the first direction or another side opposite to the one side in the first direction, and the pixel region is not surrounded by the first signal line and the second signal line.

16. The liquid crystal display device of claim 1, further comprising a connection part disposed in a same layer as the first seat part, wherein one end of the connection part in the second direction is connected to either the 1-1st signal line or the 1-2nd signal line, and another end of the connection part in the second direction is connected to the first seat part.

17. The liquid crystal display device of claim 1, wherein the first seat part includes a 1-1st seat part branched toward another side of the 1-1st signal line in the second direction, and a 1-2nd seat part branched toward one side of the 1-2nd signal line in the second direction, wherein the 1-1st seat part and the 1-2nd seat part are spaced apart from each other.

18. The liquid crystal display device of claim 17, wherein a width of the first region in the second direction is constant.

19. The liquid crystal display device of claim 17, wherein the second seat part includes a 2-1st seat part branched from the second signal line toward one side in the second direction, and a 2-2nd seat part branched from the second signal line toward another side opposite to the one side, wherein the 2-1st seat part and the 2-2nd seat part respectively overlap the 1-1st signal line and the 1-2nd signal line.

20. The liquid crystal display device of claim 19, wherein the 1-1th seat part includes a first protrusion and a first recess is defined in the 1-1st seat part at another end thereof in the second direction, and the 1-2nd seat part includes a second protrusion and a second recess is defined in the 1-2nd seat part at one end thereof in the second direction, wherein the first protrusion and the second recess face each other, and the second protrusion and the first recess face each other.

21. The liquid crystal display device of claim 1, wherein at least one of the first seat part and the second seat part is wider than the seating surface of the column spacer.

* * * * *